(12) United States Patent
George et al.

(10) Patent No.: US 9,937,538 B2
(45) Date of Patent: Apr. 10, 2018

(54) HYDROCARBON SORBENT MATERIALS

(71) Applicant: JAWAHARLAL NEHRU CENTRE FOR ADVANCED SCIENTIFIC RESEARCH, Bangalore (IN)

(72) Inventors: Subi Jacob George, Bangalore (IN); Kotagiri Venkata Rao, Andhra Pradesh (IN)

(73) Assignee: Jawaharlal Nehru Centre for Advanced Scientific Research, Bangalore, Karnataka (IN)

( * ) Notice: Subject to any disclaimer, the term of this patent is extended or adjusted under 35 U.S.C. 154(b) by 0 days.

(21) Appl. No.: 15/046,031

(22) Filed: Feb. 17, 2016

(65) Prior Publication Data

US 2016/0256905 A1   Sep. 8, 2016

Related U.S. Application Data

(62) Division of application No. 13/755,363, filed on Jan. 31, 2013, now abandoned.

(30) Foreign Application Priority Data

Jun. 7, 2012   (IN) ............................ 2287/CHE/2012

(51) Int. Cl.
  *B09C 1/08* (2006.01)
  *B01J 20/30* (2006.01)
  *B01J 20/26* (2006.01)
  *B01D 15/00* (2006.01)
  *B01J 2/30* (2006.01)
  *C02F 1/28* (2006.01)
  (Continued)

(52) U.S. Cl.
  CPC ................ *B09C 1/08* (2013.01); *B01D 15/00* (2013.01); *B01D 15/08* (2013.01); *B01D 53/02* (2013.01); *B01J 2/30* (2013.01); *B01J 20/26* (2013.01); *B01J 20/267* (2013.01); *B01J 20/3071* (2013.01); *B01J 20/3085* (2013.01); *B09C 1/06* (2013.01); *C02F 1/285* (2013.01); *C09K 3/32* (2013.01); *C11D 3/3703* (2013.01); *B01D 2253/202* (2013.01); *B01D 2257/702* (2013.01); *B09C 2101/00* (2013.01); *C02F 1/681* (2013.01); *C02F 2101/32* (2013.01); *C02F 2103/007* (2013.01)

(58) Field of Classification Search
  CPC .......... C02F 1/681; C02F 1/285; B01D 15/00; B01J 20/3071; B01J 20/26; B01J 20/30; B01J 20/267
  USPC ..... 528/423; 428/544, 620, 624, 655, 539.5; 210/671, 660, 693, 502.1, 296, 435
  See application file for complete search history.

(56) References Cited

U.S. PATENT DOCUMENTS

2010/0331436 A1* 12/2010 Qiu ........................ C08G 61/10
                                                              521/124

OTHER PUBLICATIONS

Lu et al. (Chem. Mater. 2010, 22, 5964-5972).*

(Continued)

*Primary Examiner* — Shane Fang
(74) *Attorney, Agent, or Firm* — Pepper Hamilton LLP

(57) ABSTRACT

Sorbent polymers which are selective to taking up hydrocarbons are provided for separating hydrocarbons from fluids and taking up hydrocarbons from off of and intermixed with solid materials. The hydrocarbons may at least partially be expressed out of and recovered from the polymer by squeezing. The polymers may be re-used for picking up additional hydrocarbons. Methods for producing and using the polymers are also provided.

20 Claims, 2 Drawing Sheets

(51) Int. Cl.
| | |
|---|---|
| B01D 15/08 | (2006.01) |
| B01D 53/02 | (2006.01) |
| B09C 1/06 | (2006.01) |
| C09K 3/32 | (2006.01) |
| C11D 3/37 | (2006.01) |
| C02F 1/68 | (2006.01) |
| C02F 101/32 | (2006.01) |
| C02F 103/00 | (2006.01) |

(56) References Cited

OTHER PUBLICATIONS

Yoshizawa, M., et al., "Functional Molecular Flasks: New Properties and Reactions within Discrete, Self-Assembled Hosts," Angewandte Chemie International Edition, vol. 48, No. 19, pp. 3418-3438 (Apr. 23, 2009)(Abstract).
Yuan, D., et al., "Highly Stable Porous Polymer Networks with Exceptionally High Gas-Uptake Capacities," Advanced Materials, vol. 23, No. 32, pp. 3723-3725 (Aug. 23, 2011)(Abstract).
Yuan, J., et al., "Superwetting nanowire membranes for selective adsorption," Nature Nanotechnology, vol. 3, No. 6, pp. 332-336 (May 30, 2008)(Abstract).
Zhang X. et al. "Nanoscale Light-Harvesting Metal-Organic Frameworks," Angewandte Chemie International Edition, vol. 50, No. 25, pp. 5729-5733 (Jun. 14, 2011)(Abstract).
Zhang, X., et al., "Nanoscale Ln(III)-Carboxylate Coordination Polymers (Ln=Gd, Eu, Yb): Temperature-Controlled Guest Encapsulation and Light Harvesting," Jornal of American Chemical Society, vol. 132, No. 30, pp. 10391-10397 (Jul. 8, 2010)(Abstract).
"Nanotechnology-based solutions for oil spills," Nano werk, accessed at http://www.nanowerk.com/spotlight/spotid=20215.php, Posted on Feb. 21, 2011, pp. 14.
"Seven Days:The news in brief," Nature, vol. 475, pp. 144-145 (Jul. 13, 2011).
"Trapping light with a twister," accessed at http://www.rdmag.com/News/FeedsAP/2011/09/energy-conocophillips-defends-handling-of-china-oil-spill, posted on Dec. 23, 2014, pp. 12.
Adebajo, M.O., et al., "Porous Materials for Oil Spill Cleanup: A Review and Synthesis and Absorbing Properties," Journal of Porous Material, vol. 10, pp. 159-170 (Sep. 2003).
Ajayaghosh, A., et al., "pi-Organogels of Self-Assembled p-Phenylenevinylenes: Soft Materials with Distinct Size, Shape, and Functions," Accounts of Chemical Research, vol. 40, No. 8, pp. 644-656 (May 10, 2007)(Abstract).
Babu, S S., et al., "Excited State Processes in Linear n-System-Based Organogels," Journal of Physical Chemistry Letters, vol. 1, No. 23, pp. 3413-3424 (Nov. 18, 2010).
Ben, T., et al., "Targeted Syntheses of a Porous Aromatic Framework with High Stability and Exceptionally High Surface Area," Angewandte Chemie International Edition, vol. 48, No. 50, pp. 9457 -9460 (Nov. 19, 2009).
Bhattacharya, S., et al., "First report of phase selective gelation of oil from oil/water mixtures. Possible implications toward containing oil spills," Chemical Communications, vol. 2, pp. 185-186 (Jan. 8, 2001).
Chen, L., et al., "CMPs as Scaffolds for Constructing Porous Catalytic Frameworks: A Built-in Heterogeneous Catalyst with High Activity and Selectivity Based on Nanoporous Metalloporphyrin Polymers," Journal of the American Chemical Society, vol. 132, No. 26, pp. 9138-9143 (Jun. 10, 2010) (Abstract).
Chen, L., et al., "Highly Efficient Activation of Molecular Oxygen with Nanoporous Metalloporphyrin Frameworks in Heterogeneous Systems," Advanced Materials, vol. 23, No. 28, pp. 3149-3154 (May 30, 2011)(Abstract).
Chen, L., et al., "Light-Harvesting Conjugated Microporous Polymers: Rapid and Highly Efficient Flow of Light Energy with a Porous Polyphenylene Framework as Antenna," Journal of the American Chemical Society, vol. 132, No. 19, pp. 6742-6748 (Mar. 10, 2010)(Abstract).
Cooper, A.I.,"Conjugated Microporous Polymers," Advanced Materials, vol. 21, No. 12, pp. 1291-1295 (Jan. 14, 2009)(Abstract).
Dastidar, P., " Supramolecular gelling agents: can they be designed," Chemical Society Reviews, vol. 37, No. 12, pp. 2699-2715 (Oct. 17, 2008)(Abstract).
Figueira-Duarte, T.M. And Mullen, Klaus., "Pyrene-Based Materials for Organic Electronics," Chemical Reviews, vol. 111, No. 11, pp. 7260-7314 ( May 2009) (Abstract).
Gaskill, M., "Oil-spill aftermath hampers rig research," Nature News, accessed at http://www.nature.com/news/20111110704/full/news.2011.396.html, accessed on Jul. 4, 2011, pp. 3.
Guterman, L., "Exxon Valdes Turns 20," Science, vol. 323, No. 5921, pp. 1558-1559 (Mar. 20, 2009)(Abstract).
Hasobe, T., et al., "Fullerene-encapsulated porphyrin hexagonal nanorods. An anisotropic donoracceptor composite for efficient photoinduced electron transfer and light energy conversion," Chemical Communications, vol. 29, pp. 3372-3374 (Jul. 1, 2008) (Abstract).
Higgins, A, "Oil Spill Likely to Hit Gulf Stream and US East Coast," accessed at https://web.archive.org/ web/20120210181945/ http://blog.alexanderhiggins.com/2010/04/30/oil-spill-hit-gulf-stream-east-coast-75/, posted on Apr. 30, 2010, pp. 11.
Hoeben, J.M.F., et al., "About Supramolecular Assemblies of n-Conjugated Systems," Chemical Reviews, vol. 105, No. 4, pp. 1491-1546 (Mar. 10, 2005) (Abstract).
Inagaki, S., et al., "Light Harvesting by Periodic Mesoporous Organosilica Chromophore," Angewandte Chemie (International Edition in English), vol. 48, No. 22, pp. 4042-4046 (Apr. 24, 2009)(Abstract).
Inokuma, Y., et al., "Crystalline molecular flasks," Nature Chemistry, vol. 3, No. 5, pp. 349-358 (2011)(Abstract).
Inokuma, Y., et al., "Networked molecular cages as crystalline sponges for fullerenes and other guests," Nature chemistry, vol. 2, No. 9, pp. 780-783 (Jul. 25, 2010)(Abstract).
Iwamoto, T., et al., "Size-Selective Encapsulation ofC60 by [10] Cycloparaphenylene: Formation of the Shortest Fullerene-Peapod," Angewandte Chemie International Edition, vol. 50, No. 36, pp. 8342-8344 (Jul. 18, 2011) (Abstract).
Jadhav, S.R., et al., "Sugar-Derived Phase-Selective Molecular Gelators as Model Solidifiers for Oil Spills," Angewandte Chemie International Editio, vol. 49, No. 42, pp. 7695-7698 (Jul. 15, 2010)(Abstract).
Jiang, J.-X., et al., "Band gap engineering in fluorescent conjugated microporous polymers," Chemical Science, vol. 2, No. 9, pp. 1777-1781 (Jul. 7, 2011) (Abstract).
Jiang, J-X. et al., "Conujugated Microporous Poly(aryleneethynylene) Networks," Angewandte Chemie International Edition, vol. 46, No. 45, pp. 8574-8578 (Sep. 26, 2007)(Abstract).
<Atsoulidis, A.P., et al., "Phloroglucinol Based Microporous Polymeric Organic Frameworks with -OH Functional Groups and High CO2 Capture Capacity," Chemistry of Materials, vol. 23, No. 7, pp. 1818-1824 (Mar. 16, 2011) (Abstract).
Kishi,N., et al., "An M2L4 Molecular Capsule with an Anthracene Shell: Encapsulation of Large Guests up to 1 nm," Journal of the American Chemical Society, vol. 133, No. 30, pp. 11438-11441 (Jun. 27, 2011)(Abstract).
Kitagawa, S., and Uemura, K.,"Dynamic porous properties of coordination polymers inspired by hydrogen bonds," Chemical Society Reviews, vol. 34, No. 2, pp. 109-119 (Jan. 4, 2005)(Abstract).
Kuhn, P., et al., "Porous, Covalent Triazine-Based Frameworks Prepared by Ionothermal Synthesis," Angewandte Chemie International Edition in English, vol. 47, No. 18, pp. 3450-3453 (Mar. 10, 2008)(Abstract).
Maji, T.k., et al.,"Expanding and Shrinking Porous Modulation Based on Pillared-Layer Coordination Polymers Showing Selective Guest Adsorption," Angewandte Chemie International Edition in English, vol. 43, No. 25, pp. 3269-3272 (May 12, 2004)(Abstract).

(56) References Cited

OTHER PUBLICATIONS

Matyjaszewski, K., et al., "Hydrogels by atom transfer radical polymerization. I. Poly(Nvinylpyrrolidinone-g-styrene) via the macromonomer method," Journal of Polymer Science Part A: Polymer Chemistry, vol. 36, No. 5, pp. 323-830 (Apr. 15, 1998)(Abstract).

Mudiyanselage, T.K., and Neckers, D.C., "Highly adsorbing superabsorbent polymer," Journal of Polymer Science Part A: Polymer Chemistry, vol. 46, No. 4, pp. 1357-1364 (Dec. 28, 2007)(Abstract).

Ni, W., et al., "Polymer nanotubes toward gelating organic chemicals," Chemical Communications, vol. 47, No. 16, pp. 7727-4729 (Mar. 17, 2011)(Abstract).

Ono, T., et al., "Molecular Design of Superabsorbent Polymers for Organic Solvents by Crosslinked Lipophilic Polyelectrolytes," Advanced Functional Materials, vol. 18, No. 24, pp. 3936-3940 (Nov. 10, 2008) (Abstract).

Oyamada, T., et al., "Unusual photoluminescence characteristics of tetraphenylpyrene (TPPy) in various aggregated morphologies," Chemical Physics Letters, vol. 421, Issue 1-3, pp. 295-299 (Apr. 3, 2006)(Abstract).

Pirondini, L., et al., "Inclusion of methano[60]fullerene derivatives in cavitand-based coordination cages," Tetrahedron, vol. 62, Issue 9, pp. 2008-2015 (Feb. 27, 2006)(Abstract).

Rao, K.V., et al., "Guest-Responsive Reversible Swelling and Enhanced Fluorescence in a Super-Absorbent, Dynamic Microporous Polymer," Chemistry a European Journal, vol. 18, Issue 15, pp. 4505-4509 (Apr. 10, 2012).

Rao, K.V., et al., "Light-Harvesting Hybrid Hydrogels: Energy-Transfer-Induced Amplified Fluorescence in Noncovalently Assembled Chromophore-Organoclay Composites," Angewandte Chemie International Edition, vol. 50, Issue 5, pp. 1179-1184 (Dec. 22, 2010)(Abstract).

Rao, K.V., et al.,"Extended phenylene based microporous organic polymers with selective carbon dioxide adsorption," Journal of Materials Chemistry, vol. 21, Issue 34, pp. 12958-12963 (Jul. 6, 2011)(Abstract).

Spangler, S., "Oil Spill Adsorbing Polymer: Changing the way environmental scientists approach Oil spills!," accessed at http://www.stevesganglerscience.com/experiment/00000108, accessed on Nov. 22, 2011, pp. 2.

Suzuki, K., et al., "Coronene Nanophase within Coordination Spheres: Increased Solubility of C60," Journal of the American Chemical Society, vol. 132, No. 8, pp. 2544-2545 (Feb. 5, 2010)(Abstract).

Sygula, A., et al., "A Double Concave Hydrocarbon Buckycatcher," Journal of the American Chemical Society, vol. 129, No. 13, pp. 3842-3843 (Mar. 10, 2007)(Abstract).

Thomas, A., "Functional Materials: From Hard to Soft Porous Frameworks," Angewandte Chemie International Edition, vol. 49, Issue 45, pp. 8328-8344 (Nov. 2, 2010)(Abstract).

Wan, S., et al., "A Photoconductive Covalent Organic Framework: Self-Condensed Arene Cubes Composed of Eclipsed 2D Polypyrene Sheets for Photocurrent Generation," Angewandte Chemie International Edition, vol. 48, No. 30, pp. 5439-5442 (May 11, 2009) (Abstract).

Wan, S., et al., "A Belt-Shaped, Blue Luminescent, and Semiconducting Covalent Organic Framework," Angewandte Chemie International Edition, vol. 47, Issue 46, pp. 8826-8830 (Oct. 1, 2008)(Abstract).

Waste Lock® Oil Absorbents, $M^2$ Polymer Technologys, Inc.,http://www.m2polymer.com/html/oil_adsorbents.html (Printed from Internet Jan. 9, 2013).

Weber, J., and Thomas A., "Toward Stable Interfaces in Conjugated Polymers: Microporous Poly(pphenylene) and Poly(phenyleneethynylene) Based on a Spirobifluorene Building Block," Jornal of the American Chemical Society, vol. 130, No. 20, pp. 6334-6335 (Apr. 24, 2008)(Abstract).

Weber, J., et al., "Microporous Networks of High-Performance Polymers: Elastic Deformations and Gas Sorption Properties," Macromolecules, vol. 41, No. 8, pp. 2880-2885 (Mar. 19, 2008)(Abstract).

Würthner, F., et al., "A Black Perylene Bisimide Super Gelator with an Unexpected J-type Absorption Band," Advanced Materials, vol. 20, No. 9, pp. 1695-1698 (Apr. 11, 2008)(Abstract).

* cited by examiner

HYDROCARBON SORBENT MATERIALS

CROSS-REFERENCE TO RELATED APPLICATIONS

The present application is a divisional application of U.S. patent application Ser. No. 13/755,363, filed Jan. 31, 2013, which claims priority under 35 U.S.C. § 119 to a corresponding patent application filed in India and having Application No. 2287/CHE/2012, filed Jun. 7, 2012, entitled "Hydrocarbon Sorbent Materials," the entire contents of which are herein incorporated by reference.

BACKGROUND

Absorbent and adsorbent materials are usable for removing and/or recovering of components from water and air, or for picking up of one material off of another. Such sorbent materials may be placed in contact with fluids to remove contaminants for purification of the fluids and/or recovery of substances from the fluids. Some examples of uses for sorbent materials may include the cleaning of exhaust air emissions from combustion or other industrial processes, the cleaning of waste water streams from industrial processes, providing purified fluids, or the clean-up of accidental spills, such as oil spills.

The growth of environmental consciousness combined with an ever-increasing use of petroleum products has led to a heightened awareness of the need to promptly and effectively remediate pollution caused by various petroleum-based activities. Governmental regulations are also becoming more and more restrictive, with ever increasing requirements for cleaner air and water.

Some methods for controlling and cleaning up oil spills on water may include containment with fences or booms, chemical dispersants to accelerate natural dispersal, and removal which may include burning the oil, skimming the oil from the water surface, or collecting the oil for further processing. Other methods may rely on the use of coagulants and catalysts to chemically interact with the oil, or may use absorbing material such as straw. While these materials may aid in removing spilled oil from water, they fail to provide an adequate environmentally acceptable solution which is able to confine, coagulate and control spilled oil in a short period of time before the oil drops below the surface of the water and forms an emulsion with the water, rendering removal very difficult.

For collection of hydrocarbons, some of the materials used, such as organogels, work only in confined environments where they are not subjected to fluctuation in the medium or environmental conditions which tend to break up bonding interactions. Some materials are unstable at higher temperatures, and therefore are not usable in exhaust streams. Still other materials, such as porous silica based products are inefficient, and inorganic nanowires are not amenable to large scale production, nor are they completely reusable over extended periods of time. Therefore, there remains a need for a sorbent material which can be synthesized on a large scale, is low cost, reusable and is stable in different environmental conditions and in different mediums.

SUMMARY

This disclosure is not limited to the particular systems, devices and methods described, as these may vary. The terminology used in the description is for the purpose of describing the particular versions or embodiments only, and is not intended to limit the scope.

In an embodiment, a sorbent may include cross-linked units having a structure of formula: —$[XY_n]$—$_m$ wherein X comprises a multivalent $C_5$ to $C_{50}$ cycloalkyl, multivalent $C_5$ to $C_{50}$ heterocycloalkyl, multivalent $C_5$ to $C_{50}$ aryl, multivalent $C_5$ to $C_{50}$ heteroaryl, or combinations thereof, Y comprises a divalent $C_5$ to $C_{30}$ cycloalkyl, divalent $C_5$ to $C_{30}$ heterocycloalkyl, divalent $C_5$ to $C_{30}$ aryl, divalent $C_5$ to $C_{30}$ heteroaryl, or combinations thereof; n is an integer of 2 to 10; and m is an integer greater than or equal to 2.

In an embodiment, a method for synthesizing a sorbent, may include crosslinking multivalent components to form a cross-linked composition having a regular repeating structure of formula: —$[XY_n]$—$_m$ wherein X is the multivalent component, Y is a cross-linking component, n is an integer of 2 to 10, m is an integer greater than or equal to 2, and the multivalent component comprises $C_5$ to $C_{50}$ cycloalkyls, $C_5$ to $C_{50}$ heterocycloalkyls, $C_5$ to $C_{50}$ aryls, or $C_5$ to $C_{50}$ heteroaryls, or combinations thereof. In one embodiment, the cross-linking Y component may be a covalent bond, or a divalent component, or combinations thereof.

In an additional embodiment, a method for preparing a sorbent may include combining at least one 1,3,6,8-tetra-substituted-pyrene and 4,4'-biphenyldiboronic acid bis(pinacol) at a molar ratio of about 1:2 to form a first mixture, introducing a solvent to the first mixture to form a second mixture, introducing a base and a transmetallation catalyst to the second mixture to form a third mixture, and reacting the third mixture for a period of time sufficient for forming the sorbent in the third mixture.

In a further embodiment, a method for extracting hydrophobic material may include contacting a composition containing at least one hydrophobic material with a sorbent having a structure of formula —$[XY_n]$—$_m$, wherein X comprises a multivalent component comprising a $C_5$ to $C_{50}$ cycloalkyl, $C_5$ to $C_{50}$ heterocycloalkyl, $C_5$ to $C_{50}$ aryl, $C_5$ to $C_{50}$ heteroaryl, or combinations thereof, Y comprises a divalent component comprising a $C_5$ to $C_{30}$ cycloalkyl, $C_5$ to $C_{30}$ heterocycloalkyl, $C_5$ to $C_{30}$ aryl, $C_5$ to $C_{30}$ heteroaryl, or combinations thereof, n is an integer of 2 to 10, and m is an integer greater than or equal to 2, wherein the at least one hydrophobic material is taken up by the sorbent by at least one of adsorption and absorption, and separating the sorbent with at least one hydrophobic material from the composition.

In an additional embodiment, a filter for extracting at least one hydrophobic material from a fluid comprises a sorbent having a structure of formula —$[XY_n]$—$_m$ wherein X comprises a multivalent component comprising a $C_5$ to $C_{50}$ cycloalkyl, $C_5$ to $C_{50}$ heterocycloalkyl, $C_5$ to $C_{50}$ aryl, $C_5$ to $C_{50}$ heteroaryl, or combinations thereof, Y comprises a divalent component comprising a $C_5$ to $C_{30}$ cycloalkyl, $C_5$ to $C_{30}$ heterocycloalkyl, $C_5$ to $C_{30}$ aryl, $C_5$ to $C_{30}$ heteroaryl, or combinations thereof, n is an integer of 2 to 10, and m is an integer greater than or equal to 2.

DETAILED DESCRIPTION

Figure 1:
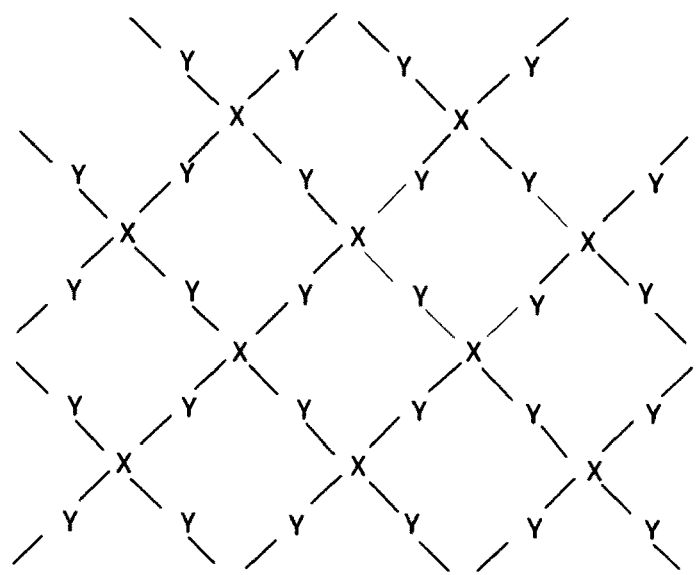
FIG. 1 depicts a general structural representation of a sorbent polymer according to an embodiment.

An oil spill is generally considered as an undesired release of a liquid petroleum hydrocarbon, or refined petroleum products into the environment as a result of human activity. Some of these hydrocarbons include, for example, crude oil, gasoline, kerosene, diesel fuel, jet fuel, hexane, ethanol, methanol and pentane. While the term 'oil spill' is most often used for spills in marine areas from tankers or offshore drilling rigs, it may also apply to accidental releases on land as well. In addition, there are also sources of oil seepage into waters and/or onto land as a result of natural features. These releases are pollutants to the environment and may have toxic effects on the life forms which are located in the vicinity of the release.

Attempts to control or clean up such hydrocarbon releases may be by chemical dispersion, combustion, mechanical containment, and/or adsorption, and may take weeks, months or even years to clean up. Available techniques for clean-up of hydrocarbon materials remain inadequate to solve the problem of massive spills. There remains a need for a product which is relatively inexpensive, commercially viable, usable for a variety of materials, usable under a wide variety of conditions, even extreme temperatures, and may be re-usable.

A hydrophobic, super-absorbent polymer is provided which selectively separates hydrocarbons from hydrocarbon containing fluids, and may readily take-up hydrocarbons from solid surfaces and particulate matter as well. The generally selective sorption of hydrocarbons may be due to Van der Waal's, π-π interactions, and host-guest interactions. The rejection of polar liquids arises from its hydrophobicity. The polymer is a regular repeating cross-linked structure of multivalent cyclic organic components cross-linked with divalent cyclic organic components having a structure of formula $-[XY_n]-_m$ wherein X is the multivalent component, and Y is the divalent component, n is an integer of 2 to 10, and m is an integer greater than or equal to 2. In an embodiment, n may be 2, 3 or 4.

As the central structural component, the multivalent component may be a multivalent $C_5$ to $C_{50}$ cycloalkyl, a multivalent $C_5$ to $C_{50}$ heterocycloalkyl, a multivalent $C_5$ to $C_{50}$ aryl, a multivalent $C_5$ to $C_{50}$ heteroaryl, or any combination thereof. In an embodiment, the multivalent component may be the multivalent $C_8$ to $C_{50}$ polycyclic aryl or multivalent $C_8$ to $C_{50}$ polycyclic heteroaryl.

The cross-linking divalent component may be any divalent $C_5$ to $C_{30}$ cycloalkyl, divalent $C_5$ to $C_{30}$ heterocycloalkyl, divalent $C_5$ to $C_{30}$ aryl, divalent $C_5$ to $C_{30}$ heteroaryl, or combinations thereof. In an embodiment, the cross-linking component may be the multivalent $C_5$ to $C_{30}$ polycyclic aryl or multivalent $C_5$ to $C_{30}$ polycyclic heteroaryl.

A super-absorbent polymer of this type may be usable for taking up hydrophobic substances, such as hydrocarbons, from a solid surface, or from a granulated solid material, or from a fluid, either liquid or gas, or from combinations of such materials. The polymer may be dispersed onto the hydrophobic substances directly, may be dispersed into fluids containing the hydrophobic substances, or may be incorporated into a filter. The filter may be a flow-through type having a bed of polymer retained in a structural housing by fluid permeable members, or the filter may have polymer retained on a support structure, such as a material or fiber mat, or incorporated into an open-cell polymer foam. The filter may be stationary in a fluid environment, or may be moved through a fluid bed to retrieve hydrocarbons from the fluid.

Hydrophobic absorbent polymer structures may be prepared by providing appropriate substituents on cyclic or aryl organic reactants and cross-coupling the reactants with one another or coupling with additional reactants to provide regular repeating structure of cross-linked multivalent components and divalent components. Examples of coupling reactions which may be usable for some reactants include the Suzuki Coupling and the Yamamoto-type Ullmann Cross-Coupling.

In an embodiment, a method for synthesizing a sorbent, may include crosslinking multivalent components to form a cross-linked composition having a regular repeating structure of formula: $-[XY_n]-_m$ wherein X is the multivalent component, Y is a cross-linking component, n is an integer of 2 to 10, m is an integer greater than or equal to 2, and the multivalent component comprises $C_5$ to $C_{50}$ cycloalkyls, $C_5$ to $C_{50}$ heterocycloalkyls, $C_5$ to $C_{50}$ aryls, or $C_5$ to $C_{50}$ heteroaryls, or combinations thereof. In one embodiment, the cross-linking Y component may be a covalent bond, or a divalent component, or combinations thereof.

In an embodiment, wherein the cross-linking component may be an additional divalent component, the multivalent component and divalent component may be provided at a molar ratio of about 1:10 to about 2:1. The cross-linking may be done by contacting the multivalent component and divalent component in the presence of a catalyst, which may be a transmetallation catalyst. In an embodiment the reactant multivalent component may be pyrene, and the pyrene may be a tetra-substituted pyrene having a substituent at each of positions 1, 3, 6 and 8. The substituent may be a halogen, and in an embodiment, the halogen may be bromine. In an embodiment the reactant divalent component may be a polyphenyl, and the polyphenyl may have substituent boron groups.

In a further embodiment wherein the cross-liking component is a covalent bond, the cross-linking may be done by contacting the multivalent component and a catalyst, which in some embodiments may be a transmetallation catalyst.

One configuration for such a super-absorbent polymer is shown in FIG. 1, wherein X represents the multivalent component and Y represents the divalent component. Regular repeating triangular-patterned structures, or pentagonal or hexagonal-patterned structures are also possible, and the pattern would be provided by the configuration of the components used.

The bonding of organic components to form such a net-like latticework structure produces a polymer having numerous interstitial spaces that may be capable of accepting fluid therein. With a multiplicity of cyclic carbon components providing this structural network, the polymer may be strongly hydrophobic, providing minimal, if any, interaction with polar substances (water), while having a strong affinity, or attraction for hydrocarbons (oils). Hydrocarbons may therefore be pulled into the polymer to occupy the available space, while polar fluids may be substantially completely omitted. This type of structural polymer would therefore provide desirable characteristics for removal of hydrocarbons from fluids, such as recovery of oil in an oil spill scenario.

A polymer having such a regular repeating structure which produces a relatively large amount of interstitial space and has a strong affinity for hydrocarbons may thereby exhibit both adsorptive and absorptive characteristics for taking-up the hydrocarbons. Some hydrocarbons may be adsorbed to the structure, wherein the molecules adhere to the structure via interactive bonding. The interstitial spaces, may, on the other hand, act as a sponge, and soak-up a considerable amount of additional hydrocarbon. This ability to absorb like a sponge also enables a large portion of the hydrocarbons to be expressed back out of the polymer, for example by applying pressure to the polymer to squeeze out the hydrocarbon. The polymer may then once again have free space therein for re-use of the polymer for soaking-up additional hydrocarbon. This re-usability may thereby provide a very cost-efficient product for retrieval of hydrocarbons.

To provide such a regular repeating 'net-like' structure, at least one of, or both of the X and Y components may have at least one axis of symmetry. In an embodiment the X and Y components may be substantially planar. In an embodiment, the X-component may be an organic compound having a symmetrical structure with at least one axis of symmetry, such as that of pyrene or phenanthrene, for example.

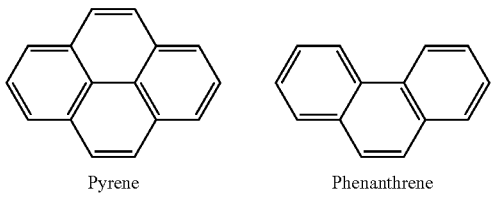

Pyrene                    Phenanthrene

The X-component may also have symmetrically located bonding positions for the cross-linking Y component. The Y component may also be an organic compound having a symmetrical structure with at least one axis of symmetry, such as that of a para-polyphenyl, for example.

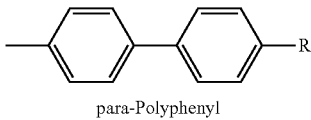

para-Polyphenyl

The R may be one or more additional para-phenyl groups. In an embodiment, R may be 2, 3 or 4 phenylgroups.

The X component may be selected from, but is not limited to, cyclopentane, benzene, azulene, naphthalene, acenaphthylene, biphenylene, acenaphthene, anthracene, phenanthrene, pyrene, tetracene, triphenylene, phenanthrene, corannulene, perylene, coronene, bisanthrene, terrylene, ovalene, circumpyrene, [10]annulene, [14]annulene, [18]annulene, piperidine, oxane, thiane, pyridine, pyran, or thiopyran.

In an embodiment, the Y component may be an organic compound with two or more phenyl connected to one another by a covalent bond, —O—, —S—, —NR—, —PR—, —POR—, $C_1$-$C_4$ alkyl, $C_2$-$C_4$ alkenyl, $C_2$-$C_4$ alkynyl, or combinations thereof, wherein R at each instance is —H, —OH, or $C_1$-$C_4$ alkyl. In one embodiment, the Y component may be a polyphenyl having 2, 3, or 4 phenyl groups connected by a covalent bond.

In an alternative embodiment, the Y component may be selected from, but is not limited to phenyl, biphenyl, thiophene, bithiophene, terthiophene, benzo[c]thiophene, dibenzothiophene, naphthalene, anthracene, pyrene, terphenyl, carbazole, triphenylene, chrysene, benzanthracene, bipyridine, terpyridine, pentacene, benzofuran, dibenzofuran, benzimidazole, indene, quinoline, phenanthroline, benzothiazole, fluorene, 9,9-diarylfluorene or 9,9-dialkylfluorene or combinations thereof.

In an embodiment wherein X is pyrene, each pyrene may be bonded to the Y component at positions 1, 3, 6 and 8. In a further embodiment, wherein Y is biphenyl, each biphenyl may be bonded to X at one or more of positions 4 and 4'. If X is pyrene and Y is biphenyl, the polymer will have the structure as shown in FIG. 2.

Figure 2:
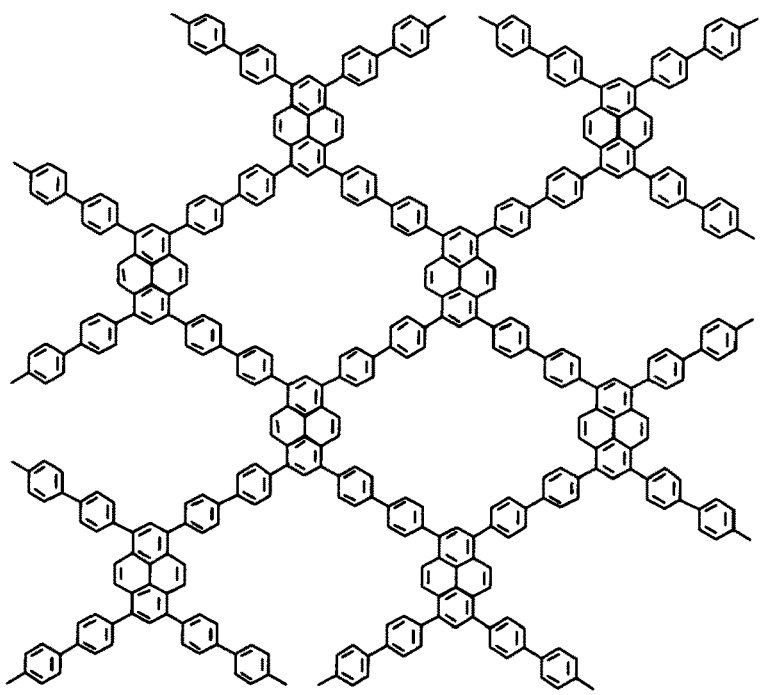
FIG. 2 depicts a molecular representation of a sorbent polymer according to an embodiment.

This superabsorbent pyrene-biphenyl polymer (Py-BPP) of FIG. 2 takes up over 12 times its weight in diesel fuel, and is stable at temperatures up to about 500° C. Because of its non-polar, porous structure, hydrocarbons are able to penetrate deep into the Py-BPP and polar compounds are substantially omitted. When placed in an oil-water mixture, the Py-BPP is able to remove essentially all of the oil from the water, leaving the water substantially oil free. The Py-BPP may therefore provide an efficient material for clean-up of oil spills which occur in bodies of water, such as a tanker spill in the ocean. Under some conditions, 100% of the oil may be removed from oil-water mixtures. Py-BPP would essentially function in the same manner in any fluid stream for removal of hydrocarbons from the fluid, and is therefore usable as a fluid purification material.

After picking up hydrocarbons, at least about 40% of the hydrocarbons may be recovered from the Py-BPP by applying pressure and squeezing the hydrocarbon from the polymer. Under some conditions, such as temperature and type of hydrocarbons, at least about 60% of the hydrocarbons have been recovered from the Py-BPP by applying pressure and squeezing. Further, if heat is used during the recovery (temperatures below the vaporization or combustion temperature of the hydrocarbons), either by heating the hydrocarbon saturated Py-BPP prior to squeezing, or applying heat during the squeezing process, at least about 90% of the picked up hydrocarbons may be recovered from the polymer. Any recovered hydrocarbons may be re-used. In an ideal embodiment, 100% of the hydrocarbons may be recovered.

Additional hydrocarbon may be removed from the Py-BPP by immersing the polymer in a solvent which dissolves the hydrocarbon and/or heating the Py-BPP to vaporize or burn off any hydrocarbons which will vaporize or burn at temperatures below about 500° C.

The Py-BPP may be re-used for picking up addition hydrocarbons, and may be re-used over 100 times without showing any significant loss of its ability to pick up hydrocarbons. After use, the wet Py-BPP may be stored in containment vessels, or the wet polymer may be dried prior to storage. Some examples of hydrocarbons which may be able to be taken up by the Py-BPP include, but are not limited to crude oil, gasoline, kerosene, diesel fuel, jet fuel, hexane, ethanol, methanol and pentane.

Since Py-BPP has been found to be stable at temperatures up to about 500° C., the polymer is also usable in combustion exhausts for removing hydrocarbon contaminants from the heated exhaust stream. Py-BPP provides an effective filtering agent for removal of hydrocarbons from fluids, and also clean-up of hydrocarbon spills from solid materials as well.

The Py-BPP may be prepared by at least the following two processes: a Suzuki coupling reaction (shown in FIG. 3) of 1,3,6,8-tetrabromopyrene with 4,4'-biphenyldiboronic acid bis(pinacol); or

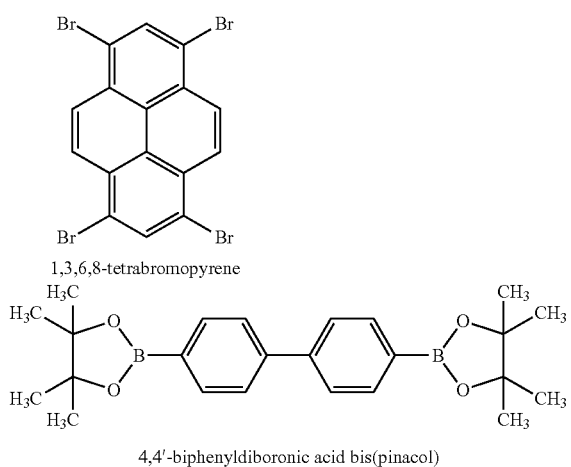

1,3,6,8-tetrabromopyrene 4,4'-biphenyldiboronic acid bis(pinacol)

a Yamamoto-type Ullmann cross-coupling reaction (shown in FIG. 4) of 1,3,6,8-tetrakis-(4-bromo-phenyl)-pyrene.

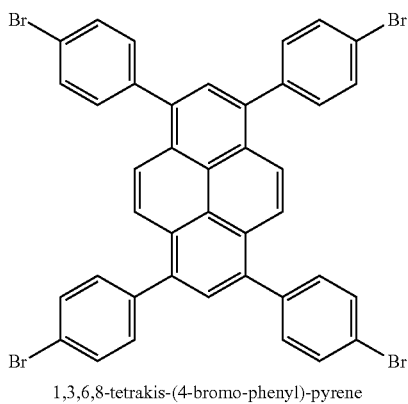 [SMILES: Brc1ccc(-c2cc(-c3ccc(Br)cc3)c3ccc4c(-c5ccc(Br)cc5)cc(-c5ccc(Br)cc5)c5ccc2c3c54)cc1]

1,3,6,8-tetrakis-(4-bromo-phenyl)-pyrene

Figure 3:
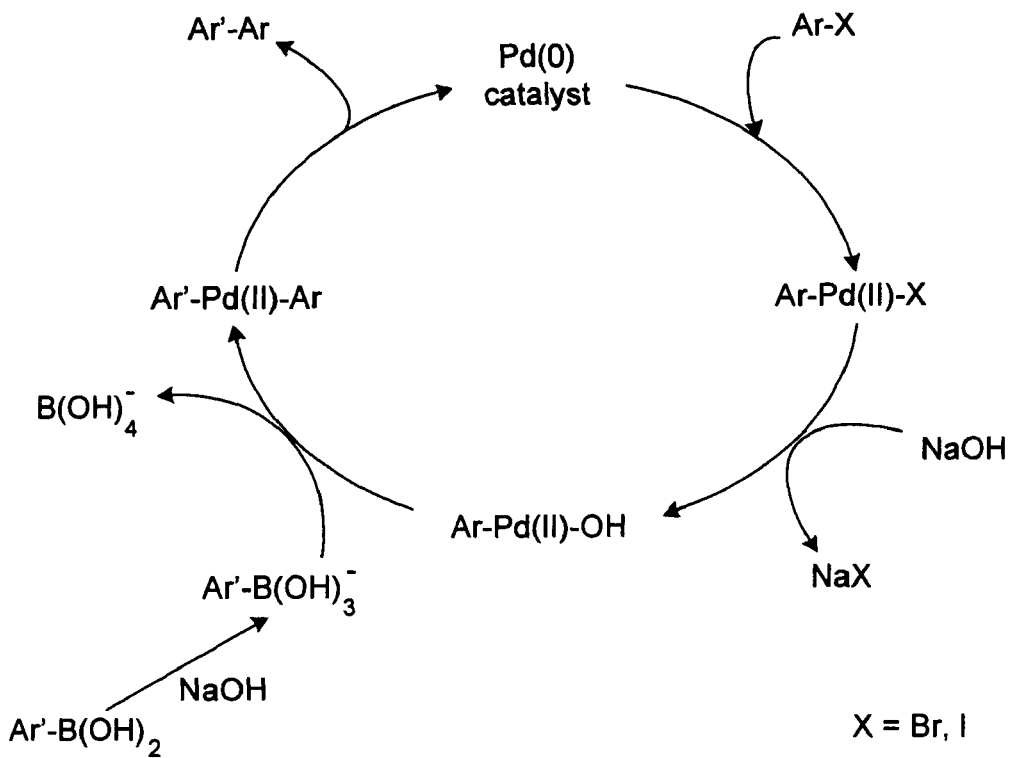
FIG. 3 depicts a synthesis process for producing a sorbent polymer according to an embodiment.

As shown in FIG. 3, a Suzuki reaction is a transmetallation reaction involving a catalyzed coupling between an organoboronic compound and halides. The boronic compound is activated by a base so that the boron atom enhances polarization of the organic ligand, and facilitates transmetallation. For synthesis of Py-BPP, the 1,3,6,8-tetrabromopyrene (TBP) and 4,4'-biphenyldiboronic acid bis(pinacol) (BDPE) may be reacted with a transmetallation catalyst in the presence of a solvent and a base. The reaction time may be from about 12 hours to about 40 hours.

With reference to FIG. 3, Ar—X represents the TBP and Ar'—B(OH)$_2$ represents the BDPE. The first step in the reaction, starting from the palladium catalyst, is the oxidative addition of palladium to the bromide of TBP to form the organopalladium species Ar—Pd(II)—X. Reaction with base gives an intermediate Ar—Pd(II)—OH, which via transmetallation with the boron-ate complex Ar—B(OH)$_3$ forms the organopalladium species Ar'—Pd(II)—Ar. Reductive elimination restores the original palladium catalyst leading to the desired monomers Ar'—Ar. Repetition of the above steps leads to the super absorbent micro porous polymer Py-BPP.

Catalysts which may be used include catalysts which are capable of carrying out a transmetallation with a halogenated organic compound. Some transmetallation catalysts which may be used include, but are not limited to tetrakis (triphenylphosphine)-palladium(0), tris-(dibenzylidene-acetone)-dipalladium(0), bis-(tri-t-butylphosphine)-palladium, tetrakis-(triphenylarsine)-palladium(0), dichlorobis-(triphenylphosphine)-palladium(II), benzylchlorobis-(triphenylphosphine)-palladium(II), paladacycle catalysts, Bis(1,5-cyclooctadiene)nickel(0) or combinations thereof.

Some solvents which may be used include, but are not limited to dimethyl formamide, dimethyl sulfoxide, acetonitrile, propylene carbonate, ethylene carbonate, 3-methoxypropionitrile, methoxyacetonitrile, dimethoxyethane, diethyl carbonate, diethyl ether, diethyl carbonate, dimethyl carbonate, 1,2-dimethoxy ethane, 1,3-dioxolane, methyl formate, 2-methyl tetrahydrofuran, 3-methoxy-oxaziridine-2-one, sulfolane, tetrahydrofuran, or combinations thereof.

Some bases which may be used include, but are not limited to potassium carbonate, sodium hydride, sodium hydroxide, sodium bicarbonate, pyrrolidinopyridine, pyridine, triethylamine, tributylamine, trimethylamine, dimethylaminopyridine, diisopropylamine, diisopropylethylamine, 1,8-diazabicyclo[5.4.0]undec-7-ene, sodium hydroxide, N-ethyldiisopropylamine, N-(methylpolystyrene)-4-(methylamino)pyridine, potassium bis(trimethylsilyl)-amide, sodium bis(trimethylsilyl)amide, potassium tert-butoxide, lithium diisopropylamide, lithium 2,2,6,6-tetramethylpiperidine, butyllithium or combinations thereof.

Figure 4:
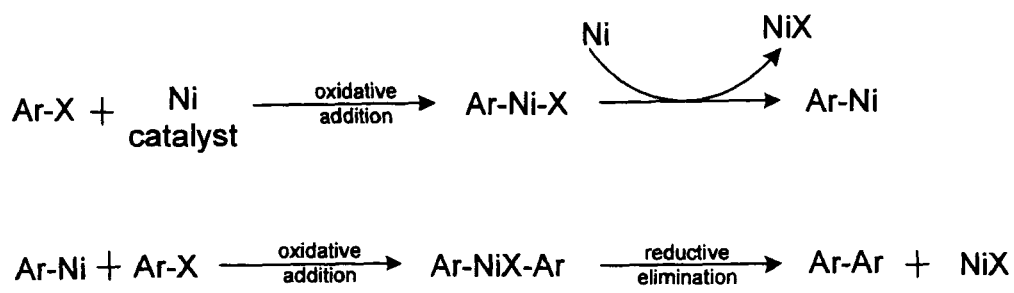
FIG. 4 depicts an alternative synthesis process for producing a sorbent polymer according to an embodiment.

The Py-BPP may also be produced by the Yamamoto-type Ullmann cross-coupling reaction as illustrated in FIG. 4. In this reaction, halogenated aryls undergo a transmetallation reaction with a catalyst in the presence of a solvent, providing a continuous combination of aryls. For synthesis of Py-BPP in accordance with an embodiment, 1,3,6,8-tetrakis-(4-bromo-phenyl)-pyrene may be reacted with the transmetallation catalyst in the presence of a solvent.

With reference to FIG. 4, Ar—X represents the 1,3,6,8-tetrakis-(4-bromo-phenyl)-pyrene. The first step in the reaction, starting from the catalyst, would be an oxidative addition of the nickel to the 1,3,6,8-tetrakis-(4-bromo-phenyl)-pyrene to form the organonickel species Ar—Ni—X. Reaction with additional Ni may then remove the halogen from the 1,3,6,8-tetrakis-(4-bromo-phenyl)-pyrene to provide an intermediate which may then react with additional 1,3,6,8-tetrakis-(4-bromo-phenyl)-pyrene to form the organonickel species Ar'—NiX—Ar. Reductive elimination would remove the NiX leading to the desired combinant Ar—Ar. Repetition of the above steps may yield the super absorbent micro porous polymer Py-BPP.

Catalysts which may be used include catalysts which are capable of carrying out a transmetallation with a halogenated organic compound. Some transmetallation catalysts which may be used include, but are not limited to bis(1,5-cyclooctadiene)nickel(0) tetrakis(triphenylphosphine)-palladium(0), tris-(dibenzylidene-acetone)-dipalladium(0), bis-(tri-t-butylphosphine)-palladium, tetrakis-(triphenylarsine)-palladium(0), dichlorobis-(triphenylphosphine)-palladium(II), benzylchlorobis-(triphenylphosphine)-palladium(II), or paladacycle catalysts, or combinations thereof.

Some solvents which may be used include, but are not limited to dimethyl formamide, dimethyl sulfoxide, acetonitrile, propylene carbonate, ethylene carbonate, 3-methoxypropionitrile, methoxyacetonitrile, dimethoxyethane, diethyl carbonate, diethyl ether, diethyl carbonate, dimethyl carbonate, 1,2-dimethoxy ethane, 1,3-dioxolane, methyl formate, 2-methyl tetrahydrofuran, 3-methoxy-oxaziridine-2-one, sulfolane, tetrahydrofuran, or combinations thereof.

EXAMPLE 1

Synthesis of a Sorbent Polymer by Suzuki Coupling

An exemplary sorbent polymer, Py-BPP, may be synthesized from 1,3,6,8-tetrabromopyrene (TBP) and 4,4'-Biphenyldiboronic acid bis(pinacol) ester (BDPE) in the presence of the catalyst tetrakis(triphenylphosphine)-palladium(0) mixed at the molar ratios of about 1:2:0.1.

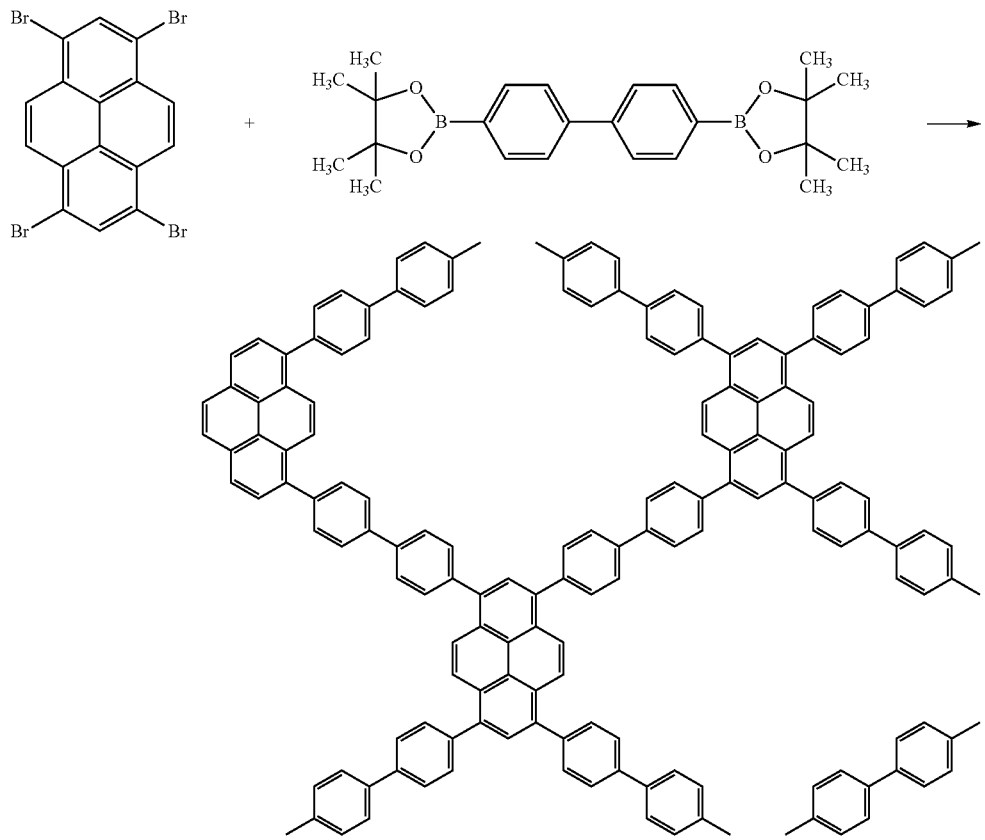

A first mixture was made by mixing 0.1 g of 1,3,6,8-tetrabromopyrene (TBP, 0.19 mmol) and 0.15 g of 4,4'-Biphenyldiboronic acid bis(pinacol) ester (BDPE, 0.38 mmol) in 20 ml of dimethyl formamide (DMF) in a nitrogen atmosphere. The mixture was degassed by four freeze-pump-thaw cycles to remove unwanted/excess dissolved gases such as oxygen. For the freeze-pump-thaw cycles, the reaction vessel was evacuated and refilled with argon or nitrogen gas. Evacuation and re-filling were repeated one more time. The mixture was then cooled in liquid nitrogen with application of vacuum (5 bar) to the reaction mixture to solidify the solvent in the reaction vessel. After complete solidification of the solvent, the mixture was removed from the liquid nitrogen, and was moved to, and retained in a hot water (45° C.) bath until the solvent returned to a liquid state. This process was repeated four times.

Following the degassing, 2 ml of 2M potassium carbonate ($K_2CO_3$) in water and 45 mg of tetrakis(triphenylphosphine)-palladium(0) (38.9 μmol) were added to the mixture. The mixture was again degassed by four freeze-pump-thaw cycles in the manner as set forth above. The resultant mixture was purged three times with nitrogen gas. Other possible purging gases may include neon, argon, krypton, xenon, or radon, or combinations thereof. The purged mixture was heated to, and maintained at about 150° C. in a schlenk flask for a duration of 36 hours with continuous stirring to carry out the desired reaction (the Suzuki coupling). This temperature and duration essentially allows for the resultant polymer to attain its desired functionality and properties.

The resultant mixture was cooled to room temperature and poured into water to dissolve unused potassium carbonate and other salts such as potassium bromide. The precipitate was filtered from the mixture and washed with methanol and dichloromethane. The washed filtrate (the Py-BPP) was dried in a vacuum at approximately 0.1 bar at a temperature of about 50° C. to about 60° C.

To ensure that there were no soluble monomers and oligomers in the desired final product, the filtrate was purified by sequential soxhlet extractions with methanol, dichloromethane, toluene and tetrahydrofuran for about 12 hours each. Approximately 150 mg of Py-BPP was obtained as a dark green solid.

EXAMPLE 2

Synthesis of a Sorbent Polymer by Yamamoto-Type Ullman Cross-Coupling

An exemplary sorbent polymer, Py-BPP, may be synthesized from 1,3,6,8-tetrakis-(4-bromo-phenyl)-pyrene in the presence of bis(1,5-cyclooctadiene)nickel(0) catalyst.

A first mixture was prepared by placing 1 g (1.2 mmol) of 1,3,6,8-tetrakis-(4-bromo-phenyl)-pyrene in 100 mL of solvent DMF. This mixture was degassed by four freeze-pump-thaw cycles to remove unwanted/excess dissolved gases such as oxygen. For the freeze-pump-thaw cycles, the reaction vessel was evacuated and refilled with argon or nitrogen gas. This evacuation and re-filling was repeated one additional time. This was followed by cooling of the mixture in liquid nitrogen with application of vacuum (5 bar) to the reaction mixture. This solidified the solvent in the reaction vessel. After complete solidification of the solvent, the mixture was removed from the liquid nitrogen, and was moved to, and retained in a hot water (45° C.) bath until the solvent returned to a liquid state. This process was repeated four times.

Following the degassing, 2.25 g of bis(1,5-cyclooctadiene)nickel(0) (8.18 mmol) was added to the mixture. The mixture was again degassed by four freeze-pump-thaw cycles as discussed above. The resultant mixture was purged three times with nitrogen gas, followed by heating the mixture to, and maintaining the mixture at about 80° C. in a schlenk flask for a duration of about 12 hours with continuous stirring to carry out the desired reaction (the Yamamoto-Ullman coupling). This temperature and duration may allow for the resultant polymer to attain its desired functionality and properties.

The resultant mixture was cooled to room temperature and concentrated HCl was added. The precipitate was filtered from the mixture and washed with chloroform, tetrahydrofuran and water, respectively. The washed filtrate (the Py-BPP) was dried in a vacuum at a pressure of approximately 0.1 bar at a temperature of about 50° C. to about 60° C.

EXAMPLE 3

Characterization of a Sorbent Polymer

One exemplary sorbent polymer, Py-BPP, was evaluated with various systems to verify its structure and evaluate its functionality.

$N_2$ gas adsorption experiments (77 K) of the polymer (desolvated at 483 K) show a typical type-I profile of the isotherms with steep uptake at low pressure regions and a maximum $N_2$ uptake of 332 mL/g. This uptake indicates the micro-porous nature of the polymer. The adsorption isotherm also shows an increase in $N_2$ uptake at P/P0>0.8 (P0 is the saturated vapor pressure of the gas at 77 K). This may be attributed to the interparticulate porosity associated with the meso- and macrostructures of the bulk sample.

BET (Brunauer-Emmett-Teller) evaluation of the polymer using a Quuantchrome Quadrasorb-SI analyzer showed the surface area of Py-BPP to be about 370 $m^2/g$.

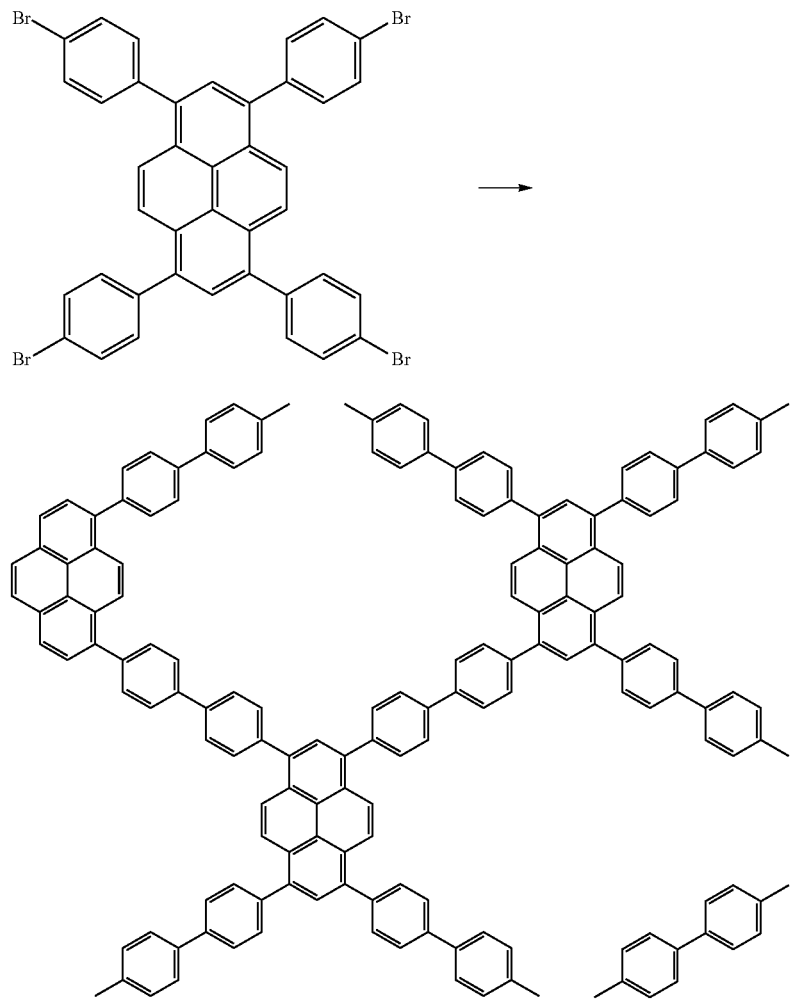

An emission spectra of Py-BPP measured with Perkin Elmer Ls55 Luminescence Spectrometer showed a greenish yellow emission at about 500-700 nm with a maximum emission at about 520 nm. The red-shifted absorption (374 nm), and emission at 520 nm of Py-BPP compared to tetraphenyl pyrene ($\lambda_{abs}$=320 nm and $\lambda_{em}$=450 nm) and indicates the presence of extended conjugation in the polymer. These results essentially indicate that the Py-BPP combines both the micro-porous and luminescent functionalities that are consistent with its structure.

The absorbent properties of Py-BPP were investigated with petroleum products such as diesel, petrol, hexane, and ethanol. The swelling behavior of Py-BPP in petroleum products and ethanol was studied in terms of the equilibrium state of swelling parameter (Q %) and equilibrium solvent content (H %) that may be calculated from the weight of dried and swollen polymers using the following equations:

$$H=((W_{wet}-W_{dry})/W_{wet})\times 100$$

$$Q=(W_{wet}/W_{dry})\times 100$$

Where Q is the equilibrium state of swelling parameter, H is the equilibrium solvent content, Wdry is the weight of the polymer before absorbing petroleum products, and Wwet is the weight of the polymer after absorbing petroleum products. The swelling parameter (Q) varied from 700-1100 and the solvent content (H) varied from 83-99 for the various petroleum products. These values indicate that Py-BPP may be superabsorbent. The swelling process was essentially instantaneous compared to other polymer absorbents and was stable for months. Furthermore, this process was able to be repeated many times using recycled Py-BPP after the desolvation process under vacuum. The micro-pores of Py-BPP may be structurally sound for the diffusion of small gas molecules, solvation results in the structural re-organization of the aromatic framework, resulting in the observed macroscopic swelling. This instantaneous swelling is essentially unknown in other micro-porous polymers and provides Py-BPP its ability to function as a selective absorbent material.

EXAMPLE 4

Separation of Oil from a Mixture of Oil and Water

A mixture of 18 ml of commercial diesel oil and 62 ml of water was made in an open beaker (1:3.5 volume ratio). A first 500 mg of Py-BPP was added and oil was absorbed. An additional 500 mg of Py-BPP was added to beaker to absorb any remaining oil so that there was a total of 100 mg of Py-BPP in the beaker. The polymer powder quickly absorbed the oil and swelled, increasing in size. The Py-BPP showed an uptake capacity of up to about 12 times its weight for the collection of oil. The swelled polymer was scooped out leaving the water essentially without any traces of oil. The polymer was then hand squeezed to recover oil from the polymer. The polymer was fully recovered, and about 10 ml of oil (about 55%) was recovered.

Similar phase-selective swelling and uptake by Py-BPP has been obtained for other oils and hydrocarbon solvents. The instantaneous swelling action of Py-BPP allows for a convenient ambient temperature strategy for oil recovery, without additional heating and mechanical stirring procedures.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for extracting hydrophobic material, the method comprising:
    contacting a composition with a sorbent having a structure of formula $-[XY_n]_m$ wherein,
    X comprises a multivalent component comprising a $C_5$ to $C_{50}$ cycloalkyl, $C_5$ to $C_{50}$ heterocycloalkyl, $C_5$ to $C_{50}$ aryl, $C_5$ to $C_{50}$ heteroaryl, or combinations thereof;
    Y comprises a divalent component comprising a $C_5$ to $C_{30}$ cycloalkyl, $C_5$ to $C_{30}$ heterocycloalkyl, $C_5$ to $C_{30}$ aryl, $C_5$ to $C_{30}$ heteroaryl, or combinations thereof;
    n is an integer of 2 to 10; and
    m is an integer greater than or equal to 2,
    wherein the composition comprises at least one hydrophobic material, and
    wherein the at least one hydrophobic material is adsorbed or absorbed by the sorbent; and
    removing at least a portion of the at least one hydrophobic material from the sorbent by heating the sorbent to vaporize the hydrophobic material and burn the hydrophobic material.

2. The method of claim 1, further comprising separating the sorb ent from the composition prior to the removing at least a portion of the at least one hydrophobic material from the sorbent.

3. A method for extracting hydrophobic material, the method comprising:
    contacting a composition with a sorbent having a structure of formula $-[XY_n]_m$ wherein,
    X comprises a multivalent component comprising a $C_5$ to $C_{50}$ cycloalkyl, $C_5$ to $C_{50}$ heterocycloalkyl, $C_5$ to $C_{50}$ aryl, $C_5$ to $C_{50}$ heteroaryl, or combinations thereof;
    Y comprises a divalent component comprising a $C_5$ to $C_{30}$ cycloalkyl, $C_5$ to $C_{30}$ heterocycloalkyl, $C_5$ to $C_{30}$ aryl, $C_5$ to $C_{30}$ heteroaryl, or combinations thereof;
    n is an integer of 2 to 10; and
    m is an integer greater than or equal to 2,
    wherein the composition comprises at least one hydrophobic material, and
    wherein the hydrophobic material is adsorbed or absorbed by the sorbent; and
    removing at least a portion of the at least one hydrophobic material from the sorbent by immersing the sorbent in a solvent to dissolve the at least one hydrophobic material.

4. The method of claim 1, wherein the composition containing the at least one hydrophobic material is a liquid, a gas, a solid, or a combination thereof.

5. The method of claim 1, wherein the at least one hydrophobic material comprises liquid hydrocarbon selected from petroleum products, oil, gasoline, kerosene, diesel fuel, jet fuel, hexane, ethanol, methanol, pentane and combinations thereof.

6. The method of claim 1, wherein the composition comprising the at least one hydrophobic material is a surface of a solid; and
    the contacting comprises dispersing the sorbent onto the surface.

7. The method of claim 2, wherein the separating the sorbent from the composition comprises at least one of lifting the sorbent from the composition, dumping the sorbent off from the composition, sweeping the sorbent from the composition, and vacuuming the sorbent from the composition.

8. A method for extracting hydrophobic material, the method comprising:
    contacting a composition with a sorbent having a structure of formula $-[XY_n]_m$ wherein, X comprises a multivalent component comprising a $C_5$ to $C_{50}$ cycloalkyl, $C_5$ to $C_{50}$ heterocycloalkyl, $C_5$ to $C_{50}$ aryl, $C_5$ to $C_{50}$ heteroaryl, or combinations thereof;

Y comprises a divalent component comprising a $C_5$ to $C_{30}$ cycloalkyl, $C_5$ to $C_{30}$ heterocycloalkyl, $C_5$ to $C_{30}$ aryl, $C_5$ to $C_{30}$ heteroaryl, or combinations thereof;

n is an integer of 2 to 10; and m is an integer greater than or equal to 2, wherein the composition is a mixture comprising at least one hydrophobic material and water of a water body; and taking up the at least one hydrophobic material from the mixture into the sorbent.

9. The method of claim 8, further comprising, separating the sorbent having the taken-up at least one hydrophobic material from the mixture by at least one of: scooping the sorbent from the mixture, suctioning the sorbent from the mixture, sedimentation and decanting of the water from the sorbent, and filtering the sorbent from the mixture.

10. The method of claim 1, further comprising reusing the sorbent for extracting additional at least one hydrophobic material after the removing of the at least a portion of the at least one hydrophobic material from the sorbent.

11. The method of claim 1, further comprising repeating the steps of contacting, and removing.

12. The method of claim 1, further comprising repeating the steps of contacting, and removing at least about 100 times.

13. The method of claim 3, further comprising separating the sorbent from the composition prior to the removing at least a portion of the at least one hydrophobic material from the sorbent.

14. The method of claim 3, wherein the composition containing the at least one hydrophobic material is a liquid, a gas, a solid, or a combination thereof.

15. The method of claim 3, wherein the at least one hydrophobic material comprises liquid hydrocarbon selected from petroleum products, oil, gasoline, kerosene, diesel fuel, jet fuel, hexane, ethanol, methanol, pentane and combinations thereof.

16. The method of claim 13, wherein the separating the sorbent from the composition comprises at least one of lifting the sorbent from the composition, dumping the sorbent off from the composition, sweeping the sorbent from the composition, and vacuuming the sorbent from the composition.

17. The method of claim 3, further comprising reusing the sorbent for extracting additional at least one hydrophobic material after the removing of the at least a portion of the at least one hydrophobic material from the sorbent.

18. The method of claim 8, wherein the at least one hydrophobic material comprises liquid hydrocarbon selected from petroleum products, oil, gasoline, kerosene, diesel fuel, jet fuel, hexane, ethanol, methanol, pentane and combinations thereof.

19. The method of claim 9, further comprising, removing at least a portion of the at least one hydrophobic material from the sorbent by heating the sorbent to vaporize the hydrophobic material and burn the hydrophobic material.

20. The method of claim 9, further comprising, removing at least a portion of the at least one hydrophobic material from the sorbent by immersing the sorbent in a solvent to dissolve the at least one hydrophobic material.

* * * * *